United States Patent
Roy-Chowdhury et al.

(10) Patent No.: US 7,774,332 B2
(45) Date of Patent: Aug. 10, 2010

(54) ENABLING INTERACTIVE INTEGRATION OF NETWORK-ACCESSIBLE APPLICATIONS IN A CONTENT AGGREGATION FRAMEWORK

(75) Inventors: Amber Roy-Chowdhury, Cary, NC (US); Srikanth Thirumalai, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 11/104,068

(22) Filed: Apr. 12, 2005

(65) Prior Publication Data

US 2006/0230062 A1 Oct. 12, 2006

(51) Int. Cl.
*G06F 7/00* (2006.01)

(52) U.S. Cl. .................. 707/707; 709/217; 709/223; 715/742

(58) Field of Classification Search ............ 707/999.01, 707/999.103, 707; 709/217, 223; 715/742
See application file for complete search history.

(56) References Cited

U.S. PATENT DOCUMENTS

| | | | |
|---|---|---|---|
| 5,708,828 A | 1/1998 | Coleman | |
| 5,797,006 A | 8/1998 | Sitbon et al. | |
| 5,826,102 A | 10/1998 | Escobar et al. | |
| 5,878,258 A | 3/1999 | Pizi et al. | |
| 5,909,550 A | 6/1999 | Shankar et al. | |
| 5,953,720 A | 9/1999 | Mithal et al. | |
| 5,961,593 A | 10/1999 | Gabber et al. | |
| 5,983,248 A | 11/1999 | DeRose et al. | |
| 5,991,794 A | 11/1999 | Hodges et al. | |
| 5,999,938 A | 12/1999 | Bliss et al. | |
| 6,112,215 A | 8/2000 | Kaply | |
| 6,208,345 B1 | 3/2001 | Sheard et al. | |
| 6,308,178 B1 | 10/2001 | Chang et al. | |
| 6,321,374 B1 | 11/2001 | Choy | |
| 6,334,158 B1 | 12/2001 | Jennyc et al. | |
| 6,344,855 B1 | 2/2002 | Fisher et al. | |
| 6,374,270 B1 | 4/2002 | Maimon et al. | |
| 6,449,767 B1 | 9/2002 | Krapf et al. | |
| 6,453,335 B1 | 9/2002 | Kaufmann | |
| 6,615,166 B1 * | 9/2003 | Guheen et al. | 709/220 |
| 6,625,624 B1 | 9/2003 | Chen et al. | |
| 6,662,237 B1 | 12/2003 | Leckie | |
| 6,718,332 B1 * | 4/2004 | Sitaraman et al. | 707/100 |
| 6,795,868 B1 | 9/2004 | Dingman et al. | |

(Continued)

FOREIGN PATENT DOCUMENTS

CA 2191640 5/1998

(Continued)

OTHER PUBLICATIONS

Allen et al., "Portals and Portlets 2003", UK e_Science Technical Report Series, UKeS-2004-06, Sep. 2004.*

(Continued)

*Primary Examiner*—Hosain T Alam
*Assistant Examiner*—Jieying Tang
(74) *Attorney, Agent, or Firm*—Marcia L. Doubet (57) ABSTRACT

Enabling network-accessible applications to be integrated into content aggregation frameworks (such as portals) and to become dynamically interactive through proxying components (such as proxying portlets), thereby providing run-time cooperation and data sharing.

17 Claims, 8 Drawing Sheets

U.S. PATENT DOCUMENTS

| | | | |
|---|---|---|---|
| 6,823,369 B2 * | 11/2004 | Leach et al. | 709/206 |
| 6,839,701 B1 | 1/2005 | Baer et al. | |
| 6,918,088 B2 | 7/2005 | Clark et al. | |
| 6,950,990 B2 | 9/2005 | Rajarajan et al. | |
| 6,950,991 B2 | 9/2005 | Bloomfield et al. | |
| 6,981,263 B1 | 12/2005 | Zhang et al. | |
| 6,990,653 B1 | 1/2006 | Burd et al. | |
| 7,062,511 B1 | 6/2006 | Poulsen | |
| 7,089,560 B1 | 8/2006 | Uhler et al. | |
| 7,100,165 B2 | 8/2006 | Eldridge et al. | |
| 7,103,642 B1 | 9/2006 | Chen et al. | |
| 7,103,844 B2 | 9/2006 | Jones et al. | |
| 7,107,543 B2 | 9/2006 | Berry et al. | |
| 7,111,060 B2 | 9/2006 | Araujo et al. | |
| 7,117,504 B2 * | 10/2006 | Smith et al. | 709/201 |
| 7,143,076 B2 | 11/2006 | Weinberg et al. | |
| 7,146,563 B2 | 12/2006 | Hesmer et al. | |
| 7,167,448 B2 | 1/2007 | Wookey et al. | |
| 7,188,112 B1 | 3/2007 | Lindquist et al. | |
| 7,194,683 B2 | 3/2007 | Hind et al. | |
| 7,200,804 B1 | 4/2007 | Khavari et al. | |
| 7,203,909 B1 | 4/2007 | Horvitz et al. | |
| 7,210,098 B2 | 4/2007 | Sibal et al. | |
| 7,216,351 B1 | 5/2007 | Maes | |
| 7,231,608 B1 | 6/2007 | Fano et al. | |
| 7,240,280 B2 | 7/2007 | Jolley et al. | |
| 7,240,296 B1 | 7/2007 | Matthews et al. | |
| 7,246,324 B2 | 7/2007 | Mikhail et al. | |
| 7,277,924 B1 | 10/2007 | Wichmann et al. | |
| 7,281,060 B2 | 10/2007 | Hofmann et al. | |
| 7,281,202 B2 | 10/2007 | Croney et al. | |
| 7,281,217 B2 | 10/2007 | Choudhary et al. | |
| 7,299,274 B2 | 11/2007 | Rajarajan et al. | |
| 7,310,677 B1 | 12/2007 | Cohen et al. | |
| 7,313,621 B2 | 12/2007 | Gudorf et al. | |
| 7,376,739 B2 | 5/2008 | Ramaswamy et al. | |
| 2001/0034771 A1 * | 10/2001 | Hutsch et al. | 709/217 |
| 2002/0013788 A1 | 1/2002 | Pennell et al. | |
| 2002/0013827 A1 | 1/2002 | Edstrom et al. | |
| 2002/0065946 A1 | 5/2002 | Narayan | |
| 2002/0169852 A1 | 11/2002 | Schaeck | |
| 2002/0194287 A1 * | 12/2002 | Tyra et al. | 707/102 |
| 2003/0050964 A1 | 3/2003 | Debaty et al. | |
| 2003/0055878 A1 | 3/2003 | Fletcher et al. | |
| 2003/0110448 A1 | 6/2003 | Haut et al. | |
| 2003/0120593 A1 * | 6/2003 | Bansal et al. | 705/39 |
| 2003/0137534 A1 | 7/2003 | Hesmer et al. | |
| 2003/0149722 A1 * | 8/2003 | Jolley et al. | 709/203 |
| 2003/0163547 A1 * | 8/2003 | Beisty et al. | 709/217 |
| 2003/0167315 A1 | 9/2003 | Chowdhry et al. | |
| 2004/0002944 A1 | 1/2004 | Hauser et al. | |
| 2004/0003097 A1 * | 1/2004 | Willis et al. | 707/10 |
| 2004/0010598 A1 | 1/2004 | Bales et al. | |
| 2004/0015567 A1 | 1/2004 | Ziebold et al. | |
| 2004/0090969 A1 | 5/2004 | Jerrard-Dunne et al. | |
| 2004/0133660 A1 | 7/2004 | Junghuber et al. | |
| 2004/0199392 A1 | 10/2004 | Khatri et al. | |
| 2004/0199497 A1 | 10/2004 | Timmons | |
| 2004/0216036 A1 | 10/2004 | Chu et al. | |
| 2004/0225732 A1 * | 11/2004 | Coons et al. | 709/224 |
| 2004/0243577 A1 | 12/2004 | Choudhary et al. | |
| 2004/0268288 A1 | 12/2004 | Bajuk et al. | |
| 2005/0044197 A1 * | 2/2005 | Lai | 709/223 |
| 2005/0071853 A1 | 3/2005 | Jones et al. | |
| 2005/0175015 A1 | 8/2005 | Ramaswamy et al. | |
| 2006/0031222 A1 | 2/2006 | Hannsmann | |

FOREIGN PATENT DOCUMENTS

| | | |
|---|---|---|
| EP | 961451 A2 | 12/1999 |
| EP | 967558 A2 | 12/1999 |
| JP | 2000090058 A | 3/2000 |
| JP | 2000222297 A | 8/2000 |
| WO | WO 01/52056 A2 | 7/2001 |
| WO | WO 02/15074 A2 | 2/2002 |

OTHER PUBLICATIONS

Rov-Chowdhury, "Using Cooperative Portlets in WebShpere Portal V5", WebSphere Portal Development, IBM Raleigh Lab, Oct. 2003.*

Stanley K. Jerrard-Dunne, et al., U.S. Appl. No. 10/292,074, filed Nov. 12, 2002, Office Action, Mar. 22, 2007, 10 pages.

Stanley K. Jerrard-Dunne, et al., U.S. Appl. No. 10/292,074, filed Nov. 12, 2002, Office Action, Jul. 30, 2007, 10 pages.

Stanley K. Jerrard-Dunne, et al., U.S. Appl. No. 10/292,074, filed Nov. 12, 2002, Advisory Action, Oct. 16, 2007, 3 pages.

Stanley K. Jerrard-Dunne, et al., U.S. Appl. No. 10/292,074, filed Nov. 12, 2002, Office Action, Jan. 16, 2008, 13 pages.

Stanley K. Jenard-Dunne, et al., U.S. Appl. No. 10/292,074, filed Nov. 12, 2002, Office Action, Jul. 30, 2008, 12 pages.

Stanley K. Jerrard-Dunne, et al., U.S. Appl. No. 10/292,074, filed Nov. 12, 2002, Office Action, Oct. 29, 2008, 14 pages.

Stanley K. Jerrard-Dunne, et al., U.S. Appl. No. 10/292,074, filed Nov. 12, 2002, Office Action, Mar. 3, 2009, 15 pages.

Stanley K. Jerrard-Dunne, et al., U.S. Appl. No. 10/292,074, filed Nov. 12, 2002, Office Action, Sep. 3, 2009, 15 pages.

Samar Choudhary, et al., U.S. Appl. No. 10/448,968, filed May 30, 2003, Office Action, Oct. 10, 2006, 21 pages.

Samar Choudhary, et al., U.S. Appl. No. 10/448,968, filed May 30, 2003, Office Action, Apr. 19, 2007, 11 pages.

Samar Choudhary, et al., U.S. Appl. No. 10/448,968, filed May 30, 2003, Notice of Allowance, Jun. 8, 2007, 7 pages.

Shankar Ramaswamy, et al., U.S. Appl. No. 10/776,040, filed Feb. 11, 2004, Office Action, Aug. 9, 2007, 5 pages.

Shankar Ramaswamy, et al., U.S. Appl. No. 10/776,040, filed Feb. 11, 2004, Examiner Interview Summary, Nov. 16, 2007, 4 pages.

Shankar Ramaswamy, et al., U.S. Appl. No. 10/776,040, filed Feb. 11, 2004, Examiner Interview Summary, Nov. 21, 2007, 4 pages.

Shankar Ramaswamy, et al., U.S. Appl. No. 10/776,040, filed: Feb. 11, 2004, Notice of Allowance, Jan. 31, 2008, 6 pages.

Maglio, Paul and Barrett, Rob. "Intermediaries Personalize Information Streams", Communications of the ACM, vol. 43, Issue 8, Aug. 2000, pp. 96-101.

Smyth, Barry and Cotter, Paul. "A Personalized Television Listings Service", Communications of the ACM, vol. 43, Issue 8, Aug. 2000, pp. 107-111.

Rossi, Gustavo et al. "Designing Personalized Web Applications", 10th Intl. Conference on the World Wide Web, 2001, pp. 275-284.

Samaras, George and Panayiotou, Christoforos. "Personalized Portals for the Wireless User Based on Mobile Agents", 2nd Intl. Workshop on Mobile Commerce, 2002, pp. 70-74.

Murray, Meg. "An Investigation of Specifications for Migrating to a Web Portal Framework for the Dissemination of Health Information within a Public Health Network", Proceedings of the 35th Annual Hawaii International Conference of System Sciences, Jan. 10, 2002, pp. 1917-1925.

Barrett, Rob et al. "How to Personalize the Web", Proceedings of the SIGCHI Conference on Human Factors in Computing Systems, 1997, pp. 75-82.

Will, R. et al. "WebSphere Portal: Unified User Access to Content, Applications and Services", IBM Systems Journal, vol. 43, No. 2, 2004, pp. 420-429.

Abdelnur, Alejandro and Hepper, Stefan. "Java Portlet Specification, Version 1.0", Oct. 7, 2003, pp. 1-132.

Wege, Christian. "Portal Server Technology", IEEE Internet Computing, vol. 6, Issue 3, May/Jun. 2002, pp. 73-77.

Roy-Chowdhury, Amber et al. "Using Click-to-Action to Provide User Controlled Integration of Portlets", IBM DeveloperWorks web page, "http:/www.ibm.com/developerworks/websphere/library/techarticles/0212_roy/roy.html", Dec. 2002, 16 pages, printed Mar. 28, 2010.

Cowan, D. D., et al. "Application Integration: Constructing Composite Applications from Interactive Components", Software—Practice and Experience, vol. 23, No. 3, Mar. 1993, pp. 255-275.

Gest, SB, et al. "Software Development Environment—An Integrated Approach", IBM Technical Disclosure Bulletin, vol. 31, No. 10, Mar. 1989, pp. 342-344.

Morishima, et al., "Visual User Interface for Integration of Heterogeneous Information Sources", Transactions of the Institute of Electronics, Information, and Computer Engineers, vol. D82-I, No. 1, p. 315-326, Jan. 1999 (Japanese text, English abstract, partial translation on figures).

Oracle9iAS Portal Developer Services, "Overview of Information Storage", Jul. 12, 2002, http://oracle001.cedecra.it/pdk/articles/overviewinformation.storage.html, pp. 1-11.

Oracle9iAS Portal Developer Services, "An Overview of Parameters and Events", Aug. 19, 2002, http://oracle001.cedecra.it/pdk/articles/overview.parameters.events.html, pp. 1-6.

Oracle9iAS Portal Developer Services, "Getting Started - An Overview of Portlet Development", Oct. 2001, http://oracle001.cedecra.it/pdk/articles/overview.portlet.development.html, pp. 1-19.

Oracle9iAS Portal Developer Services, "Adding Parameters and Events to Portlets", Feb. 27, 2002, http://oracle001.cedecra.it/pdk/articles/adding.parameters.events.to.portlets.html, pp. 1-13.

Stanley K. Jerrard-Dunne, et al., U.S. Appl. No. 10/292,074, filed: Nov. 12, 2002, Notice of Abandonment, Mar. 11, 2010, 2 pages.

* cited by examiner

| Action | Property Type | Relative URL | Additional Metadata |
|---|---|---|---|
| EmployeeDetails | EmployeeIDType | EmployeeDetails.html | (optional) |
| ... | ... | ... | ... |

```
<exchange-metadata>
    <web-app-context-root>http://myServer.myCo.com/webApps/app1</web-app-context-root>
    <properties> <!-- For web apps which want to act as cooperation sources -->
        <property>
            <!-- note that the value of "name" element is preferably also used as the Cookie name -->
            <name>EmployeeID</name>
            <type>EmployeeIDType</type>
            <namespace>http://myCo.com/types/</namespace>
        </property>
    </properties>
    <actions> <!-- For web apps which want to act as cooperation targets -->
        <action>
            <name>EmployeeDetails</name>
            <relative-URL>EmployeeDetails</relative-URL>
            <inputs>
                <input>
                    <property-name>EmployeeID</property-name>
                </input>
            </inputs>
        </action>
    </actions>
</exchange-metadata>
```

ENABLING INTERACTIVE INTEGRATION OF NETWORK-ACCESSIBLE APPLICATIONS IN A CONTENT AGGREGATION FRAMEWORK

BACKGROUND OF THE INVENTION

1. Field of the Invention

The present invention relates generally to content aggregation frameworks (such as portals), and more particularly, enables network-accessible applications to be integrated into such frameworks and to become dynamically interactive through proxying components (such as proxying portlets), thereby providing run-time cooperation and data sharing.

2. Description of the Related Art

In recent years, a content aggregation framework based on a portal server model has become the de facto standard for development of web applications worldwide. In this approach, portal applications called "portlets" are used with the portal server.

Portlets are applications that emit markup into an aggregation stream, and have become a popular programming model. In the predominant approach, portlets are run on a portal server. A portal server may aggregate content from a number of these content-emitting applications when creating the aggregation stream. This aggregation stream represents a complete portal page, and this portal page is returned from the portal server to a client for display in the client's web browser. This portal/portlet model is well known in the art.

Portal servers process requests for page content in two phases, an "action" phase and a "render" phase, in that order. In the action phase, all invoked portlets on the page process the request, but do not generate content. It may happen for particular requests that the action phase is omitted, or may be invoked on a subset of the portlets being aggregated. In the render phase, the invoked portlets all contribute their respective chunks of content to a portal aggregation engine that aggregates the content and generates a page in response to the original request. This generated page is then sent to the requesting browser for rendering.

Figure 1:
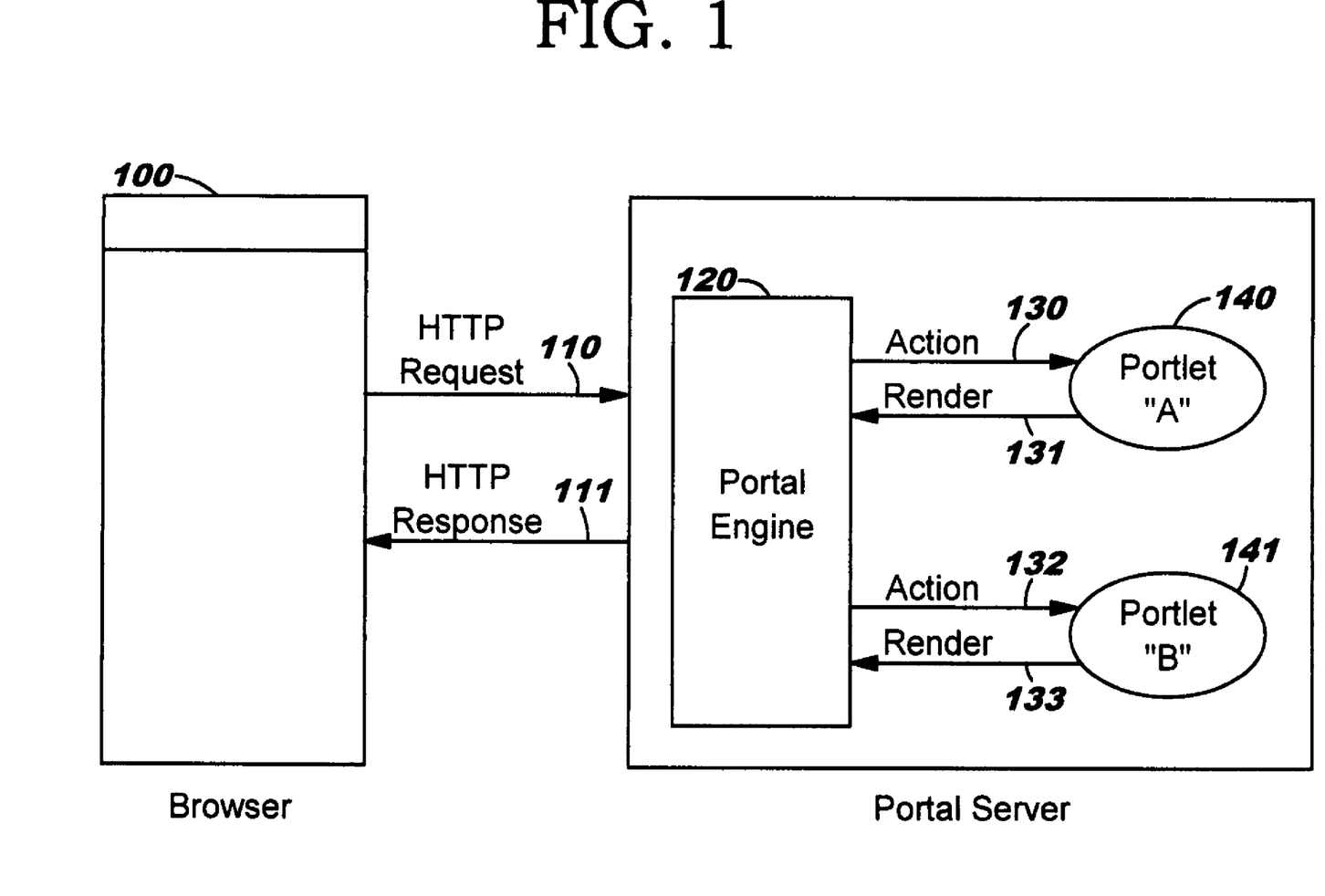
FIGS. 1 and 2 illustrate portal page request processing scenarios.

This processing is shown generally in FIG. 1, where a browser 100 sends a Hypertext Transfer Protocol ("HTTP") request 110 to a portal engine 120. (Portal implementations may be structured with functionally distinct modules referred to generally as an engine and a portlet container, where the engine is responsible for content aggregation and the container is responsible for portlet lifecycle functions that include dispatch of the action and render methods. The term "portal engine", however, is used in figures and discussions provided herewith as a reference to a combination of these two functional modules.) Supposing, for purposes of illustration, that the requested page requires input from two portlets designated in FIG. 1 as "Portlet A" 140 and "Portlet B" 141, the portal engine 120 then triggers the action phase of those portlets, as shown at 130, 132. After each of the portlets executes its respective processing, it returns content 131, 133 to the portal engine 120 during the render phase. Portal engine 120 then aggregates this content, and sends the aggregated result as an HTTP response 111 for rendering by browser 100.

Portlets adhere to a portlet application programming interface ("API") that enables their integration into the portal architecture. However, there are a large number of network-accessible applications that were not written to the portlet API, and it is often desirable to include content from these applications in the portal environment. (These non-portal network-accessible applications are referred to herein generally as "web applications", and may include so-called "legacy" applications which have been made network-accessible.) By surfacing these non-portal applications in a web portal, the portal's aggregation, personalization, and management capabilities can be leveraged.

Rewriting the applications to execute in a portal environment is cost-prohibitive in most cases, and nearly impossible in some cases (for example, where source code is not available). Accordingly, to enable integration of such web applications into the portal, a component referred to as a "generic reverse proxy portlet" may be used. (A generic reverse proxy portlet is referred to herein equivalently as a "reverse proxy portlet".) A generic reverse proxy portlet, by definition, is a portlet that mediates access to a web application and surfaces the content provided by that application in a portal page. A generic reverse proxy portlet may optionally transform the content it receives from the web application prior to sending that content to the portal's aggregation engine. Generally, a generic reverse proxy portlet is coded without specific knowledge of, or dependence on, the web application it proxies. Such portlets therefore provide an efficient means of surfacing non-portal and legacy application content in the portal environment.

Figure 2:
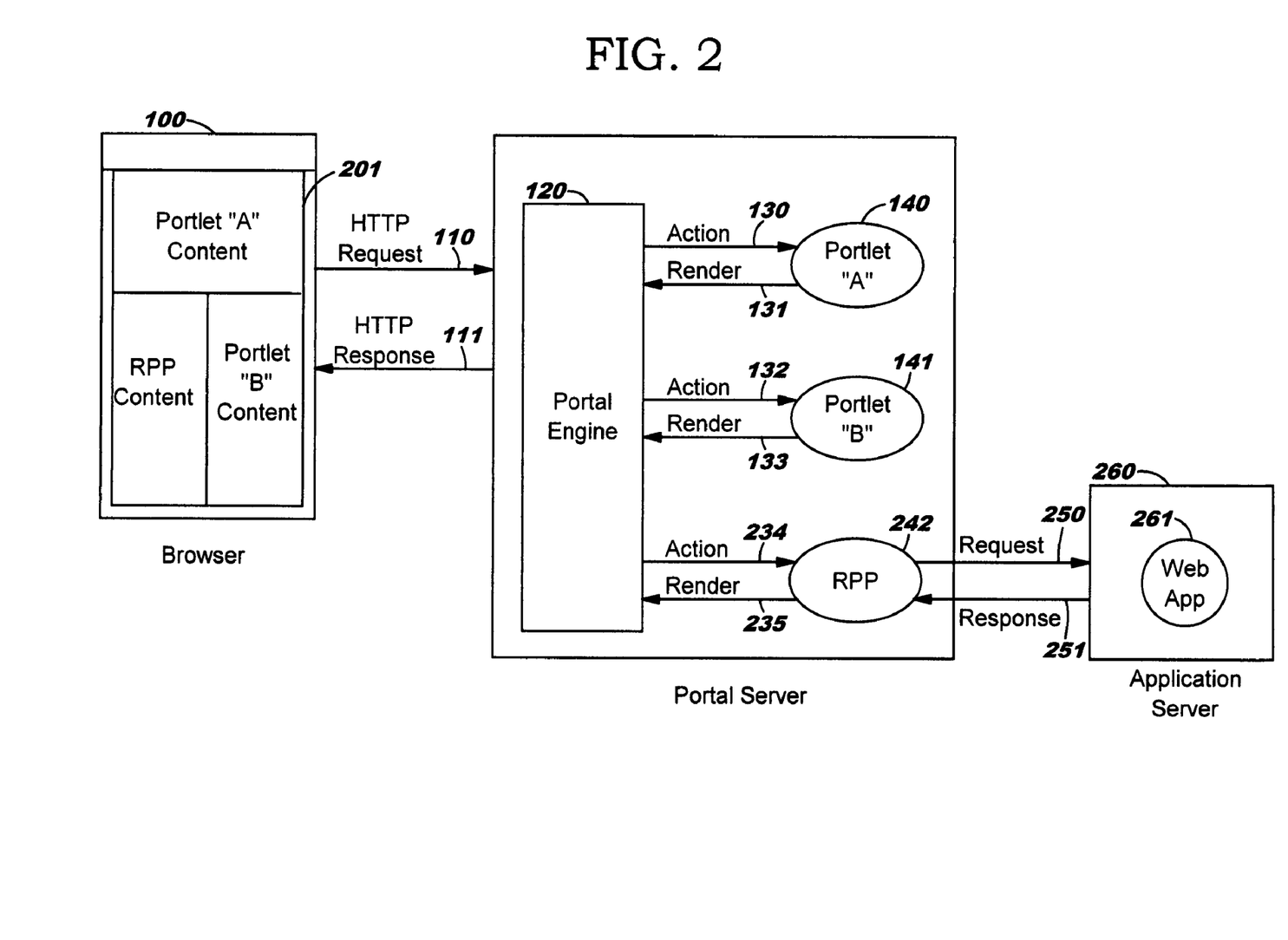

A portal page may contain content created by one or more non-portal or legacy applications (with that content surfaced through their respective generic reverse proxy portlets) and by one or more traditional (i.e., non-proxying) portlets. This scenario is illustrated in portal page 201 of FIG. 2. Again, a browser 100 sends an HTTP request 110 to a portal engine 120. Suppose, for this example, that the requested page again requires input from "Portlet A" 140 and "Portlet B" 141 but now also requires input from a non-portal web application 261 executing on an application server 260. A generic reverse proxy portlet ("RPP") 242 is therefore used to mediate access to web application 261. When the portal engine 120 receives HTTP request 110 and triggers the action phase of portlets 140, 141, and 242 (as shown at 130, 132, 234), the traditional portlets 140, 141 execute as discussed in FIG. 1. The reverse proxy portlet 242, on the other hand, makes an HTTP request 250 to the web application 261 for its content. Upon receiving the requested content in an HTTP response 251, reverse proxy portlet 242 may apply one or more configured transforms to that content (e.g., clipping off some content, applying rule-based transformation of the content, and so forth). At the least, reverse proxy portlet 242 typically transforms the proxied content by rewriting uniform resource locators ("URLs") appearing therein so that interactions initiated by the browser will pass through the proxy 242, instead of directly invoking web application 261. (This approach preserves the end user's perception of staying within the portal.) A reverse proxy portlet may also discard headers found in the proxied content to make that content suitable for inclusion in an aggregated portal page. In the render phase, portlets 140, 141 return 131, 133 their generated content and reverse proxy portlet 242 returns 235 its proxied (and transformed, if applicable) content to the portal engine 120. Portal engine 120 then aggregates this content, as in FIG. 1, and sends the aggregated result as an HTTP response 111 for rendering by browser 100. FIG. 2 shows a sample arrangement of the aggregated content in portal page 201, by way of illustration only.

While the scenarios illustrated in FIGS. 1 and 2 provide a number of advantages, portlet users desire not only to see an aggregated result of content surfaced by multiple portlets, but also to have cooperation and interaction among the content of the various portlets. In the prior art, cooperation among traditional portlets is facilitated using techniques that include a manual triggering of a publish/subscribe mechanism and an automated triggering thereof. Each of these approaches will now be briefly described.

Portal servers may provide a publish/subscribe mechanism using a run-time component called a "property broker" that enables traditional portlets to interact with each other by publishing and subscribing to information in the form of typed properties (i.e., typed data items). (This type of brokering support is commercially available, for example, in the WebSphere® Portal product marketed by International Business Machine Corporation, hereinafter "IBM". "WebSphere" is a registered trademark of IBM in the United States, other countries, or both.) The portlet that publishes a property is called a "source portlet" and a portlet that receives a published property is called a "target portlet". In a manual approach to triggering of the mechanism, the cooperation between source and target portlets may be driven through a manual "click" operation initiated by the user, whereby the click operation in a source portlet causes that portlet to publish the value of a particular property. The click operation, which is sometimes referred to as "click-to-action" or "C2A", might be carried out responsive to user activation of a graphical button rendered in the source portlet, for example. Target portlets which have registered their ability to consume the published property receive that property's value, and a predetermined action is then initiated at the target portlet in response. Refer to commonly-assigned and application Ser. No. 10/448,968, filed May 30, 2003 (now U.S. Pat. No. 7,281, 217), for more information on techniques with which this manual, user-initiated cooperation among portlets may be provided. This application, which is hereby incorporated herein by reference, is titled "System and Method for User Driven Interactive Application Integration" and is referred to hereinafter as "the first related application".

In another approach, an automated triggering of the publish/subscribe mechanism is provided whereby source portlets are "wired" to target portlets through configuration, thereby enabling automated cooperation between portlets. For example, when a source portlet publishes a particular property to the property broker, then all actions on target portlets that have been wired (i.e., configured) to this source portlet are preferably triggered by the property broker. Refer to commonly-assigned and co-pending application Ser. No. 10/292,074, filed Nov. 12, 2002, for more information on techniques with which this automated cooperation among portlets may be provided. This application, which is hereby incorporated herein by reference, is titled "Portlet Data Sharing System, Method, and Program Product" and is referred to hereinafter as "the second related application".

Still another approach is described in commonly-assigned and application Ser. No. 10/776040, filed Feb. 11, 2004 now U.S. Pat. No. 7,376,739). This application, which is hereby incorporated herein by reference, is titled "Persistence of Inter-Application Communication Patterns and Behavior Under User Control" and is referred to hereinafter as "the third related application". As disclosed therein, a persistent association may be created between properties published by a source portlet and actions of one or more target portlets. Accordingly, an action on a target portlet can occur in an automated manner, without requiring a user to manually select publication of a property that triggers the action.

In these approaches, the publish/subscribe mechanism allows for cooperation among independently-developed portlets, such that the portlets can share data dynamically and interact accordingly. The usefulness of portal content may be greatly enhanced as a result. Portlets that are capable of cooperating in this manner must interact with the property broker component of the portal run-time. This means that the portlets must be coded to declare, publish, and subscribe to properties with a property broker. Web applications, because they are not portlets, are not coded to carry out these operations with a property broker, and therefore are unable to participate in this portlet-to-portlet cooperation. Accordingly, a need remains for enabling content surfaced by reverse proxy portlets to provide the type of portlet-to-portlet cooperation available for traditional portlets.

SUMMARY OF THE INVENTION

The present invention provides techniques for enabling network-accessible applications to be integrated into content aggregation frameworks (such as portals) and to become dynamically interactive through proxying components (such as proxying portlets), thereby providing run-time cooperation and data sharing.

In one aspect, the present invention provides techniques for enabling interactive integration of network-accessible applications in a content aggregation framework environment, comprising steps of: receiving, by a component mediating access to a network-accessible application in a content aggregation framework environment, one or more data values from the network-accessible application, in addition to content received by the mediating component from the network-accessible application, wherein the receipt of the data values signals that the network-accessible application intends the data values to be shared with other components in the content aggregation framework environment and the received content is for aggregating into a content view along with content provided by one or more other components; and publishing the received data values, by the mediating component, such that the published data values are automatically shared with any of the other components which have ability to consume those data values.

In another aspect, the present invention provides techniques for sharing data values provided by network-accessible applications in a content aggregation framework environment, comprising: receiving, by a component mediating access to a network-accessible application in a content aggregation framework environment, one or more data values from the network-accessible application, in addition to content received by the mediating component from the network-accessible application, wherein the data values are to be shared with other components in the content aggregation framework environment; and forwarding the received data values from the mediating component for sharing with the other components while providing the received content, by the mediating component, to an aggregator in the content aggregation framework environment, thereby enabling the forwarded data values to be automatically shared with selected ones of the other components and the provided content is to be aggregated with other content provided by the other components.

In yet another aspect, the present invention provides techniques for enabling interactive integration of network-accessible applications in a content aggregation framework environment, comprising: registering, in the content aggregation framework environment on behalf of at least one of one or more components which provide content for aggregation in a content view renderable in the content aggregation framework environment, one or more actions and corresponding data types thereof, the actions registered on behalf of each component being those which are invocable on the component in response to run-time publishing of identified data types, and wherein at least one of the components is a mediating component that provides access to a network-accessible application; and detecting, at run-time, that one of the identified data types is published. This aspect further comprises, responsive to the detection: selecting, from the registered actions, those for which the corresponding data type matches the detected published data type; and automatically invoking the selected actions on the component on behalf of which each selected action was registered.

In a still further aspect, the present invention provides techniques for enabling interactive integration of network-accessible applications in a content aggregation framework environment, comprising: registering, by each of a plurality components which provide content for aggregation in a content view renderable in the content aggregation framework environment, one or more actions and corresponding data types thereof, the actions being those which are invocable on the component in response to run-time publishing of identified data types and wherein at least one of the components is a mediating component that provides access to a network-accessible application; and maintaining a mapping, for each of the mediating components, between the registered actions for the mediating component and an invocation target corresponding to each of the registered actions, each of the invocation targets associated with the network-accessible application for which the mediating component provides access, such that the mediating component will automatically invoke the corresponding invocation target when any selected one of registered actions is invoked on the mediating component.

In yet another aspect, the present invention provides techniques for enabling sharing of data values provided by network-accessible applications in a content aggregation framework environment, comprising: receiving, in the content aggregation framework environment, publication of at least one data type, wherein the publication is received from a mediating component that provides access to a network-accessible component that contributes content for aggregation and rendering in a view of the content aggregation framework and wherein the at least one data type has been delivered to the mediating component along with content contributed thereby; and automatically invoking an action on selected ones of one or more other components contributing content for the view, wherein the selected ones are those which have registered an ability to consume data of the received data type.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will now be described with reference to the following drawings, in which like reference numbers denote the same element throughout.

DESCRIPTION OF PREFERRED EMBODIMENTS

The present invention provides techniques whereby reverse proxy portlets fronting web applications can cooperate with one another dynamically on behalf of the web applications they proxy, and/or can cooperate dynamically with traditional portlets. As a result, a portal page can now display fully-cooperative and interactive content.

According to preferred embodiments, web applications fronted by generic reverse proxy portlets can be the source of published properties and/or the target of actions triggered by the publishing of properties by other portlets on the portal page.

Using techniques disclosed herein, a reverse proxy portlet may be enhanced to act as a source portlet. That is, a reverse proxy portlet may publish properties on behalf of the web application it proxies. A reverse proxy portlet may also, or alternatively, be enhanced to act as a target portlet. That is, a reverse proxy portlet may register actions with a property broker, where triggering one of these actions through a published property causes the reverse proxy portlet to invoke an action of the web application it proxies. (The term "action", as used herein when referring to information registered by target portlets, may comprise a name of an invocable action to be carried out at the proxied web application and/or an identification of one or more typed properties accepted by such invocable action.)

Actions may be triggered by a portal server in response to the user clicking on a link in the portlet markup. This is sometimes referred to as an "action link", to distinguish from a so-called "render link" which only results in a render request on a portlet. Actions may also be triggered through a property broker, due to properties being published (using, for example, techniques as described herein) as a result of previously-triggered actions. Typically, the first action in a request is a result of an action link being clicked upon, and subsequent actions in that request are triggered by the broker. The action phase may therefore continue transitively.

Referring first to a reverse proxy portlet acting as a source portlet, recall that a reverse proxy portlet gets content from the proxied web application during the action phase of portal request processing. If this reverse proxy portlet seeks to serve as a source portlet for cooperating with other portlets, then according to preferred embodiments, it also publishes any applicable properties of the proxied web application during this phase. To enable the reverse proxy portlet to determine which properties should be published, preferred embodiments use a simple protocol for message exchange between the reverse proxy portlet and the proxied web application, as will now be described.

In one approach, the web application is enhanced to send back the properties it wishes to publish as cookies in the HTTP response with which it sends its generated content to the reverse proxy portlet. See FIG. 3, where reverse proxy portlet 340 may send content request 250 to enhanced web application 361 in the same manner that such content request was sent by a prior art reverse proxy portlet 242 to web application 261 (as was discussed with reference to FIG. 2). However, rather than simply returning the generated content in response message 251, as in FIG. 2, the enhanced web application 361 of FIG. 3 now transmits relevant properties (i.e., the properties which it wishes to publish) in one or more cookies along with its generated content. See reference number 351 in FIG. 3, which represents this combination of cookie(s) and content. A cookie used in this manner may be referred to as a "cooperative property cookie". (If multiple property values are to be published, preferred embodiments supply each property value in its own corresponding cookie. Alternatively, the multiple property values may appear within a single cookie without deviating from the scope of the present invention.)

Figure 3:
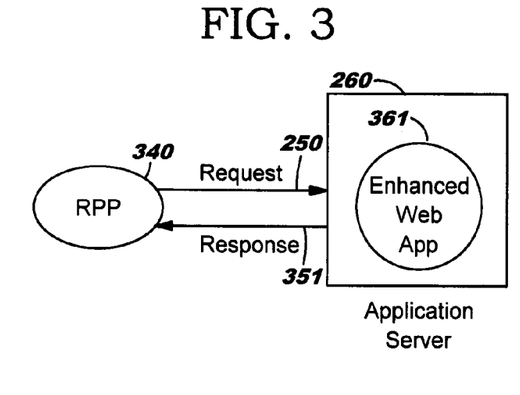
FIG. 3 illustrates a generic reverse proxy portlet acting as a source portlet and interacting with its proxied web application, according to techniques disclosed herein.
Figure 4:
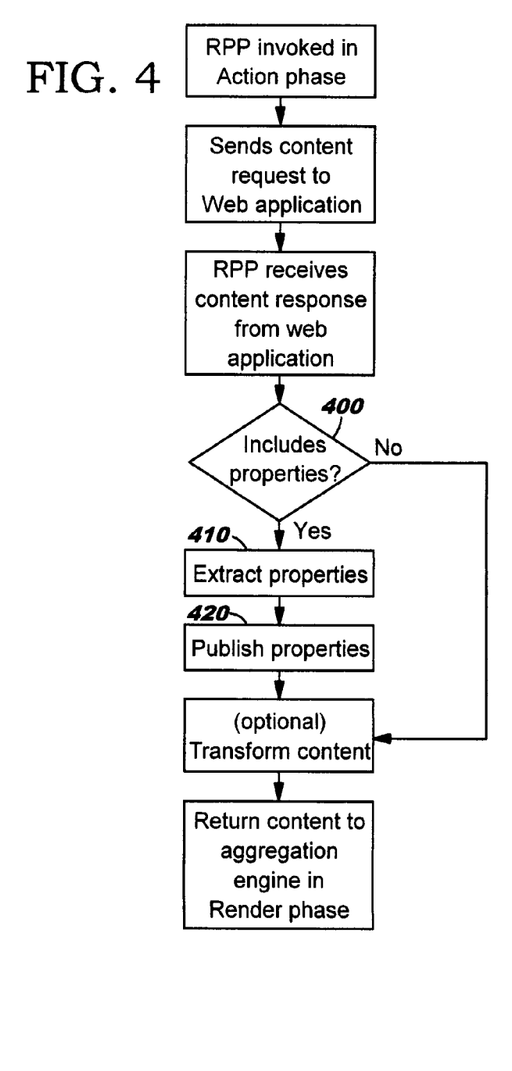
FIG. 4 depicts logic that may be used by a reverse proxy portlet acting as a source portlet.

Upon receiving response message 351, the reverse proxy portlet 340 checks the response for inclusion of cookies containing properties and, if one or more such cookies is found, the relevant properties are extracted and published to the property broker. See FIG. 4, where logic that may be used by a reverse proxy portlet acting as a source portlet is depicted.

Note that references herein to use of cookies for transmitting properties are intended by way of illustration but not of limitation. Other approaches for providing this exchange protocol may be substituted without deviating from the scope of the present invention. As one example, other response headers may be used on content response 351, including response headers created specifically for transmission of properties from web applications to source portlets.

As can be seen by the above discussion, a small enhancement is required to the web application being proxied to enable its proxy to act as a source portlet. This enhancement comprises modifications that enable the web application to send, in addition to its generated content, the properties it wishes to share with other portlets. It is believed that a small amount of code will suffice for this purpose, and that application providers will greatly favor this small code addition over having to rewrite their applications in order to surface them in a portal environment. (Note also that, according to preferred embodiments, this code addition is non-intrusive to continued use of the web application outside the content aggregation framework, such as in a direct invocation usage through a browser.)

A reverse proxy portlet acting as a source portlet maintains its generic nature, according to preferred embodiments, because it simply looks for the presence of cooperative portlet cookies in content responses and publishes properties found therein, without a need to understand those properties.

Figure 5:
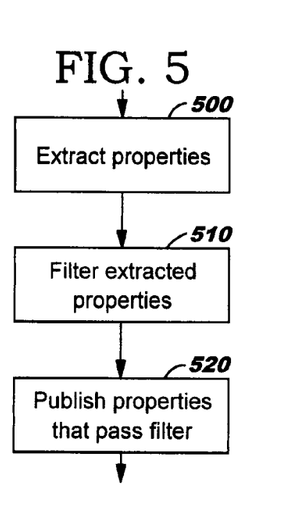
FIG. 5 depicts substitute logic that may be used when an optional property filtering aspect is provided.

Optionally, a reverse proxy portlet may be configured to filter the properties it receives, thereby potentially publishing only a subset of those properties. This approach may be useful, for example, to control the extent of cooperation provided by the source portlet. See FIG. 5, which provides logic 500, 510, 520 that may be substituted for logic 410, 420 of FIG. 4 when this optional filtering is performed at a source portlet.

Cooperation between a reverse proxy portlet acting as a source portlet and other portlets on the portal page may either be manually or automatically initiated. In a manual approach, the cooperation may be triggered, for example, by a user activating an icon and/or selecting a choice from a selection control such as a drop-down menu. Or, the association between the user's selection and the desired action at target portlets may be persisted, such that the cooperation is automatically initiated once the user manually selects a corresponding choice. (Refer to the teachings of the first and third related applications for more information on techniques for causing a user-selected choice to trigger a corresponding action at a target portlet or portlets.) Automatic cooperation may alternatively be triggered by wiring the source portlet to one or more target portlets, or more specifically, by wiring fields of a source portlet to fields of target portlets. (Refer to the teachings of the second related application for more information on techniques for wiring source portlets to target portlets.) Other techniques for causing a source property to trigger an action at a target portlet may be used without deviating from the scope of the present invention, including use of the well-known "event listeners" approach.

For the manual approach, reverse proxy portlets acting as source portlets preferably embed, in the content stream sent to the portal's aggregation engine, markup to surface an appropriate selection control in the page to be rendered. This embedded markup may be provided in a fixed position within the content stream, such as at the beginning or end thereof. (As an alternative, the proxied web application may be further enhanced to include a selection control in its generated content. However, the degree of change to the proxied web application is reduced by placing this responsibility on the reverse proxy portlet.)

For automatic cooperation, wires associating reverse proxy portlets acting as source portlets with target portlets are preferably defined in the portal server using tools provided by the portal server. The manner in which such wires are created does not form part of the inventive concepts of the present invention.

Figure 6:
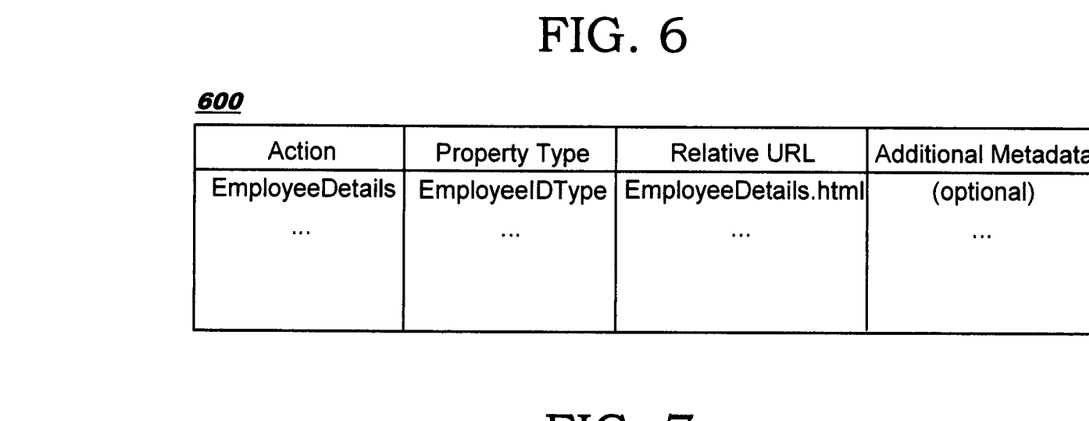
FIG. 6 illustrates sample configuration metadata for a reverse proxy portlet acting as a target portlet.

Referring now to a reverse proxy portlet acting as a target portlet, preferred embodiments configure this reverse proxy portlet with metadata pertaining to the properties for which the proxied web application can interactively respond. In preferred embodiments, this metadata describes properties to be registered with the property broker, where publication of the registered property will trigger an action on the target portlet, and (if applicable) the property type of the parameter(s) that each action accepts. (Actual values for the property are then received at run-time, when a configured property is published by a source portlet.) Corresponding to each action it will register, the reverse proxy portlet is preferably configured with a URL that it will invoke when the action is triggered. Typically, this URL will point to the web application being proxied. See FIG. 6, which provides a high-level view 600 of such metadata. Furthermore, additional metadata may also be configured (and registered) for each action to provide additional flexibility when invoking the associated action. (While this example 600 is provided using a tabular format, this is by way of illustration and not of limitation.) When registering the metadata for target portlets, the property broker preferably associates a name or other identifier of the target portlet with the metadata registered for that portlet (not shown in FIG. 6).

Figure 7:
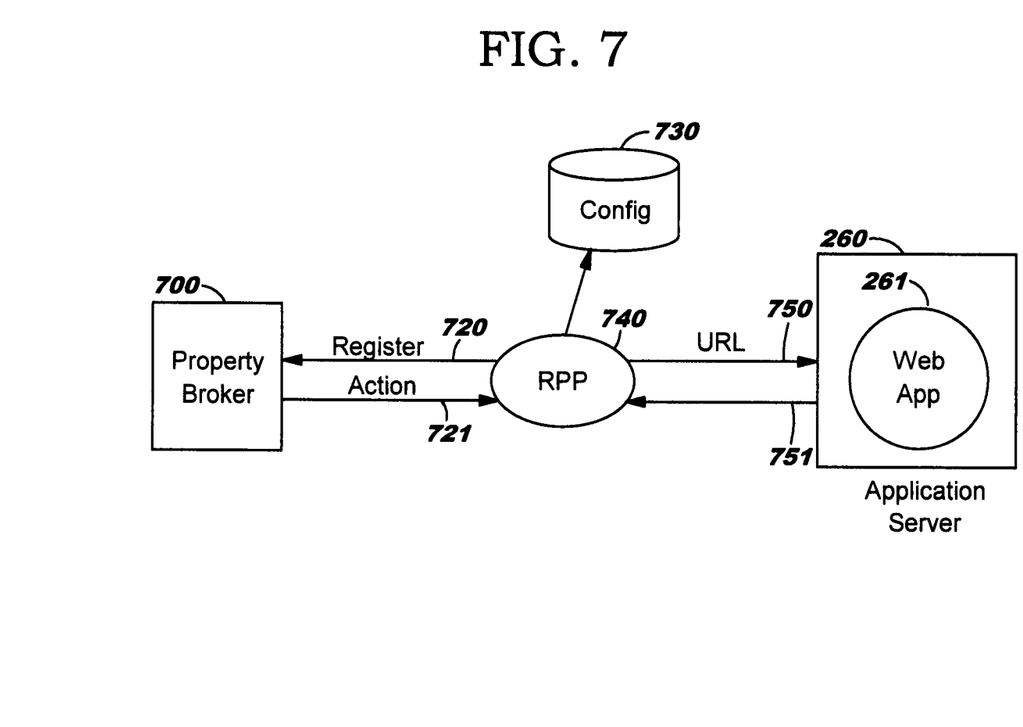
FIG. 7 illustrates such target portlet interacting with a property broker and with the web application it proxies.

Preferably, the reverse proxy portlet configured to act as a target portlet registers all actions defined in its configuration data with the property broker at initialization time. See FIG. 7, where this registration is shown by message flow 720. Preferably, reverse proxy portlet 740 consults its configuration data 730 to obtain the information sent to property broker 700 in message 720. (A reverse proxy portlet configured to act as a source portlet may also register with the property broker during its initialization, where this registration preferably comprises notifying the property broker of the properties that may be published by this source portlet.)

At run-time, the target portlet may be triggered as a result of a property published by a source portlet (which may be a traditional portlet or a reverse proxy portlet using techniques disclosed herein). This triggering is shown by message flow 721 in FIG. 7. In response, the target portlet 740 preferably consults its configuration data 730 to determine the URL corresponding to the triggered action. The target portlet 740 invokes this URL (still in the action phase of the portal request processing), as shown by message 750 flowing to web application 261, and receives content from the web application, as shown by message 751. This content may optionally be transformed, as has been discussed above (e.g., by rewriting URLs embedded therein, removing headers, and so forth), and is then returned to the portal aggregation engine (not shown in FIG. 7) in the render phase.

Notably, according to preferred embodiments, a web application fronted by a reverse proxy portlet does not require modification to enable the reverse proxy portlet to act as a target application.

It may be desirable to pass one or more parameters to a web application in the target portlet scenario. One or more parameters to be passed to the invoked URL (through query parameters programmatically appended to the URL, for example, or in the case of a POST request, may be passed as request parameters) may be set from the property value(s) passed through the property broker when the action is triggered.

Figure 8:
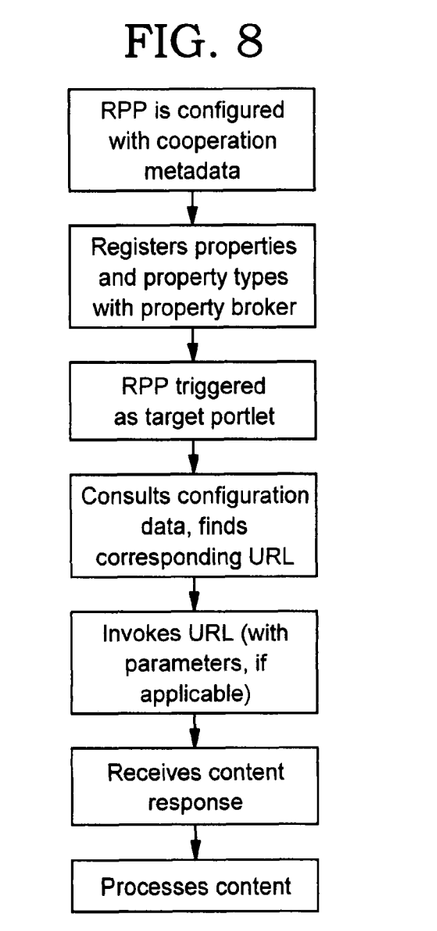
FIG. 8 depicts logic that may be used by a reverse proxy portlet acting as a target portlet.

FIG. 8 depicts logic that may be used by a reverse proxy portlet acting as a target portlet. Note that the processing of content (Block 810) received from the web application (at Block 800) may comprise prior art processing, including transformations which may be performed prior to returning the content to the portal aggregation engine in the render phase. Alternatively, the reverse proxy portlet may be acting as a source portlet as well as a target portlet. In this case, the processing at Block 810 may be preceded by operations depicted in Blocks 400-420 of FIG. 4 (and if outbound filtering is performed on properties to be published, by operations depicted in Blocks 500-520 of FIG. 5, as has been described above).

Figure 9:
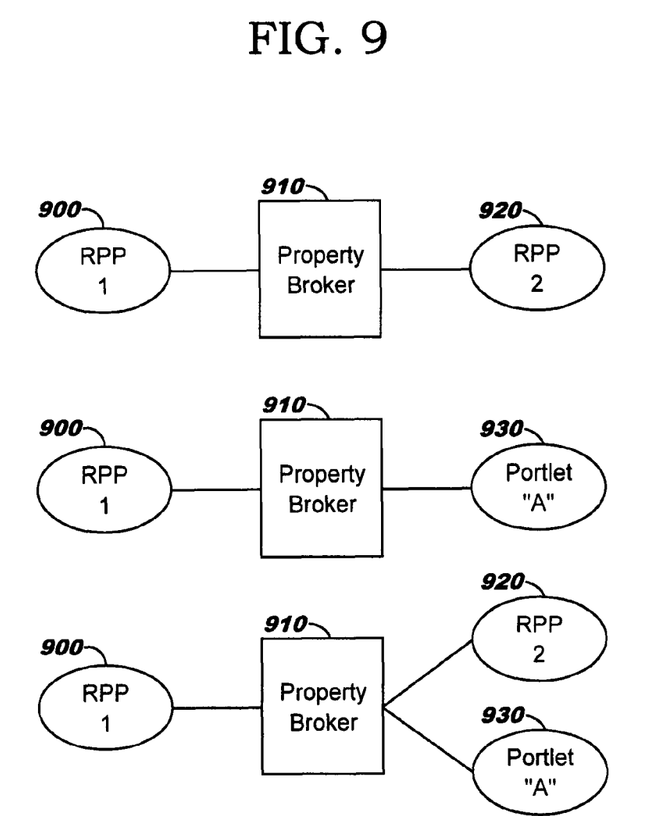
FIG. 9 presents three scenarios depicting portlet cooperation enabled by embodiments of the present invention.

FIG. 9 presents three scenarios depicting portlet cooperation, as enabled by techniques disclosed herein. In a first scenario, the cooperation occurs between a first reverse proxy portlet, "RPP 1" 900, acting as a source portlet and a second reverse proxy portlet, "RPP 2" 920, acting as a target portlet (where property broker 910 receives the published properties from source portlet 900 and triggers actions on target portlet 920 in response). In a second scenario, the cooperation occurs between reverse proxy portlet "RPP 1" 900, again acting as a source portlet, and a non-proxying portlet, "Portlet A" 930, acting as a target portlet. In a third scenario, the cooperation occurs between reverse proxy portlet "RPP 1" 900, again acting as a source portlet, and multiple target portlets, illustrated in FIG. 9 as second reverse proxy portlet "RPP 2" 920 and non-proxying portlet "Portlet A" 930.

An example scenario will now be described, in which the cooperative integration of web applications into the portal environment is demonstrated. Suppose that a company has a repository of customer orders, and a separate repository of customer contact information. These repositories may be implemented using different technologies, such as a relational database for the customer orders and a directory database for the customer contact information. Further suppose that distinct web applications have been developed for accessing the data in the two repositories. A customer satisfaction representative may use the customer orders application to query those orders which are delayed, and use the customer contact application to query the customer contact repository and thereby obtain contact information for sending a status update to the customer. Using two distinct applications in this manner is an inefficient use of time for the customer satisfaction representative, and the company may therefore want to use a portal to provide simultaneous access to the two repositories. Portlets could be developed for this purpose, but this approach requires development effort, testing, maintenance, and so forth. The company would therefore prefer to reuse the already-developed web applications. This reuse is made possible through techniques disclosed herein, whereby a reverse proxy portlet consumes the output of a web application and surfaces that output within the portal, and relatively minimal instrumentation for the existing applications enables the applications to send properties to be published (as has been discussed above).

Continuing with the example, it may be presumed that the two repositories use a customer identifier, and that this common customer identifier field enables the customer satisfaction representative to manually tie the customer order data and customer contact information together when using the existing web applications. Upon integrating these web applications into a portal environment using techniques of the present invention, when the markup for a customer order is fetched using the customer orders application, the value of the customer identifier can also be transmitted to, and published by, the reverse proxy portlet for that application (acting as a source portlet). This will trigger an action on the reverse proxy portlet for the customer contact application (acting as a target portlet), which can then use the customer identifier to retrieve the customer contact information for rendering to the customer satisfaction representative. Thus, the company is able to reap the benefits of portal, with relatively minimal effort, and integrate two already-developed, non-portal applications in a portal framework as part of the customer satisfaction task.

Notably, it is not necessary to write custom portlets or integration code when using techniques disclosed herein. Rather, each reverse proxy portlet is preferably created from a generic portlet template, and is then configured differently depending on the web application it will proxy and the properties to be produced or consumed by that web application.

Figure 10:
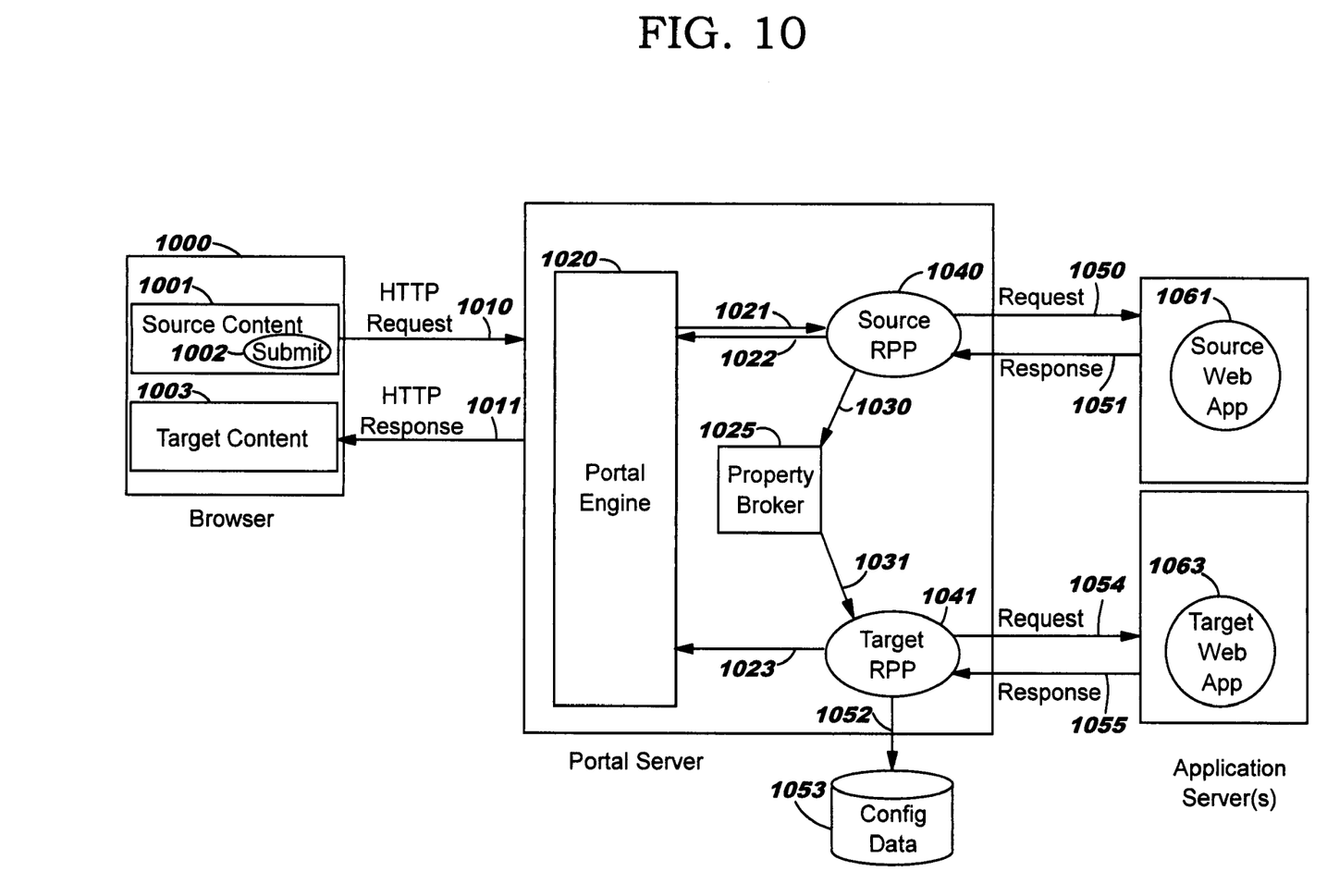
FIG. 10 provides an overview of interactive cooperation processing which uses techniques disclosed herein.

The diagram in FIG. 10 provides an overview of the interactive cooperation processing which has been discussed. Exemplary operation of this processing will now be described with reference to the figure. A user clicks on a selection control, such as a graphical "Submit" button 1002 rendered in (or associated with) the source portlet content 1001 in a browser window 1000. This causes an HTTP request 1010 for page content to be sent to the portal server. In response, as part of the action processing phase, portal engine 1020 invokes (for purposes of this example) source portlet 1040, as shown at 1021. The source reverse proxy portlet 1040 then makes an HTTP request 1050 to the source web application 1061 to retrieve content. The source web application 1061 sends back 1051 the requested content, including (for this example) a cookie specifying one or more properties that the source web application 1061 wants published.

The source portlet 1040 publishes 1030 the corresponding property or properties to the property broker 1025. (If filtering of properties is performed by source portlet 1040, then the published property or properties are those which pass the filter.) In a manually-driven approach, the source portlet 1040 may use the property broker 1025 to render a visual control in the render phase, where the user can then activate this visual control to manually publish a property and thereby trigger an action for processing the property. In a wired approach, the property broker 1025 matches each published property with one or more target portlets which have been wired to the published property from that source portlet. In either case, corresponding actions are triggered at the target portlets, as shown by message 1031 being sent to target reverse proxy portlet 1041.

It may happen that the source web application wishes to publish multiple property values, such as a list of customer identifiers. To enable the user to view each value and select from among those values to determine which one(s) will be published, a display value may be associated with each value to be published. For example, the display value for a customer identifier may be a text string containing the customer identifier, or a graphical image representing a button on which the customer identifier is displayed. This display value may then be used in conjunction with a visual control, enabling the user to activate the visual control to cause publication of selected property values.

In the action phase of the target reverse proxy portlet, it consults 1052 its configuration data 1053 and determines the URL needed to make an HTTP request to the target web application 1063. An HTTP request 1054 is then sent to that URL, and a content response is returned 1055.

The source portlet 1040 contributes content 1022 to the portal aggregation engine 1020 in the render phase of the page request processing. (Source portlet 1040 may be configured for a manually-driven approach, whereby this contributed content may be augmented with one or more visual controls for allowing the user to manually invoke the publishing of property values, as discussed above.) Target portlet 1041 also contributes content 1023 to the portal aggregation engine 1020 in the render phase of the page request processing. Portal aggregation engine 1020 then aggregates the contributed content, and returns an aggregated page resulting therefrom to the browser 1000 with an HTTP response 1011. Upon refreshing the rendered page in browser 1000, target content 1003 may then reflect results of interactions and/or data sharing between source web application 1061 and target web application 1063 (and in addition, the state of source content 1001 may be changed when the page is refreshed).

Figure 11:
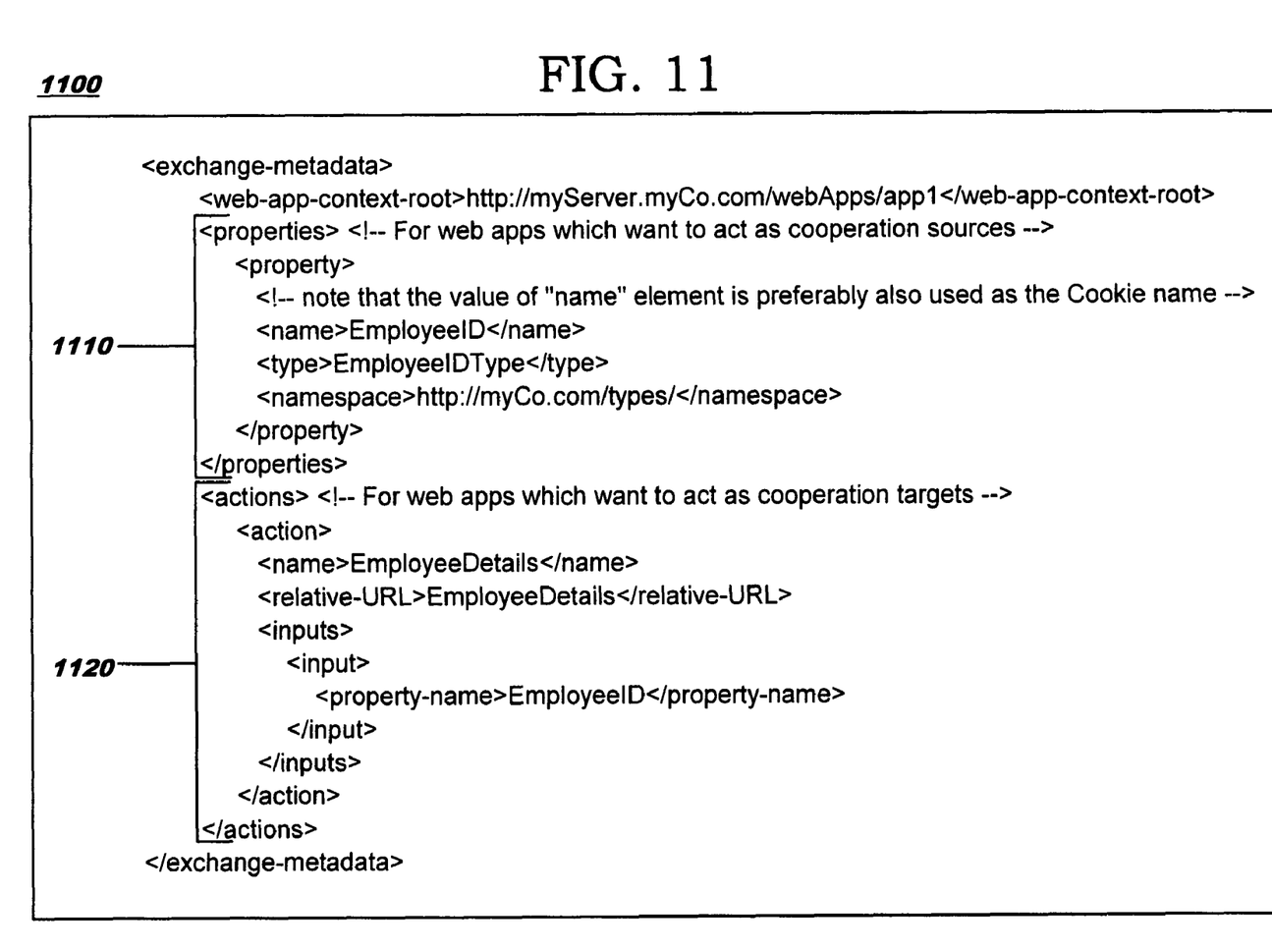
FIG. 11 illustrates a sample markup language syntax that may be used for specifying configuration metadata for reverse proxy portlets.

FIG. 11 illustrates a sample markup language syntax that may be used for specifying configuration metadata for reverse proxy portlets. This sample syntax is provided by way of illustration but not of limitation. As shown therein, exchange metadata 1100 for a particular web application to be proxied comprises properties 1110 which the web application may publish to its proxy and actions 1120 which its proxy may invoke on it. The information provided for each property to be published preferably comprises a property name (which, in preferred embodiments, is used as the cookie name on the HTTP content response; see the discussion of message flow 351 in FIG. 3) and property type, and may further comprise a namespace value. The information provided for each invocable action preferably comprises an action name and a URL or relative URL to be invoked in response to that action. If the URL accepts parameters, then the metadata preferably identifies those parameters. A reverse proxy portlet acting as a source portlet preferably maintains a mapping between cookie names it may receive and the properties to be published upon receiving those cookie names, and a reverse proxy portlet acting as a target portlet preferably maintains a mapping between actions it may receive and URLs to be invoked in response thereto. In addition, the mapping information maintained by the target portlet preferably also comprises mappings between published properties used by each action and the parameters accepted at the URL for that action.

(These mappings are preferably provided in configuration information for the reverse proxy portlets that will act as target portlets.)

Figure 12:
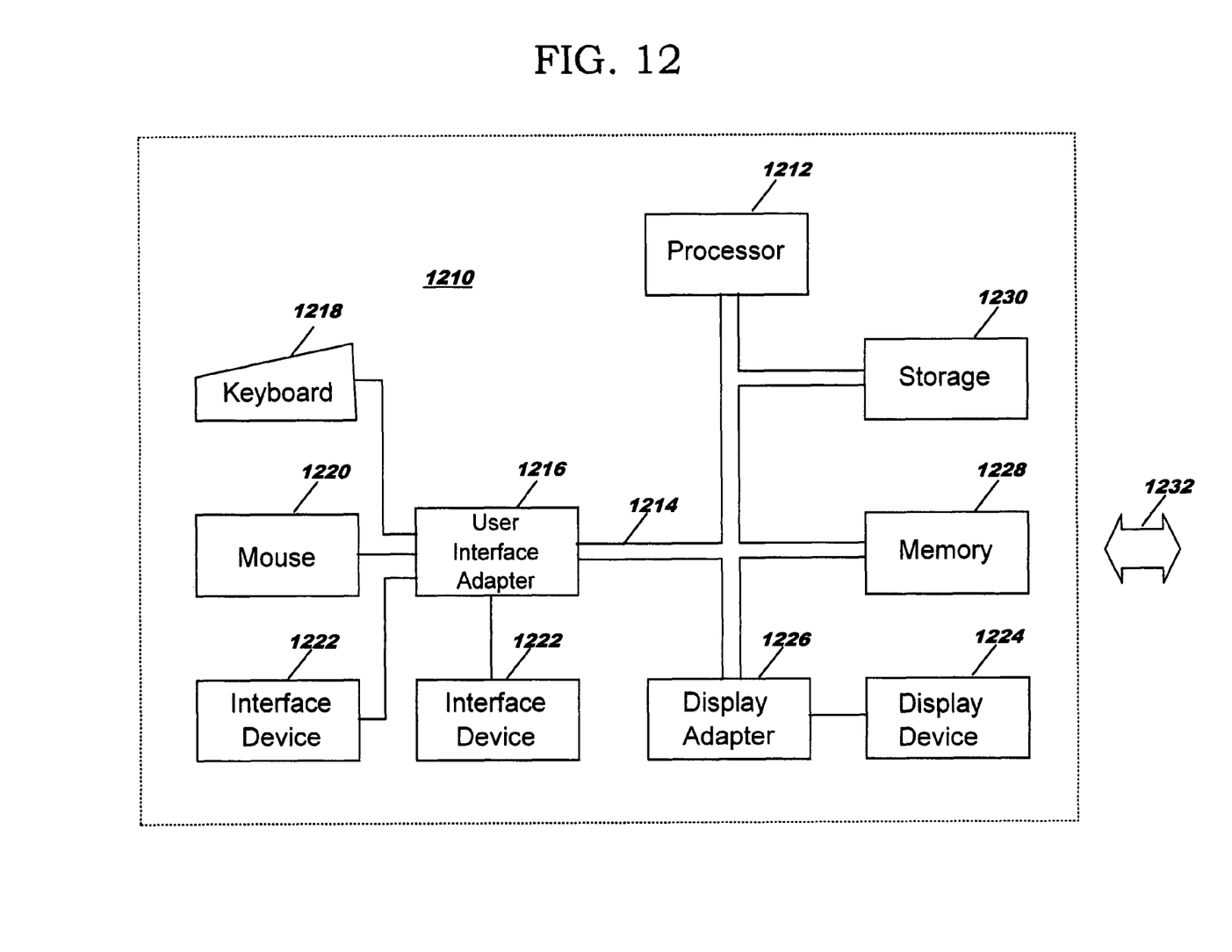
FIG. 12 provides a block diagram illustrating a computing system capable of carrying out aspects of the present invention.

Referring now to FIG. 12, a block diagram is provided that illustrates a representative computing environment capable of carrying out client-side aspects of the present invention. The environment of FIG. 12 comprises a representative computer workstation 1200, such as a desktop computer, including related peripheral devices. The workstation 1200 typically includes a microprocessor 1212 and a bus 1214 employed to connect and enable communication between the microprocessor 1212 and the components of the workstation 1210 in accordance with known techniques. The workstation 1210 also typically includes a user interface adapter 1216, which connects the microprocessor 1212 via the bus 1214 to one or more interface devices, such as a keyboard 1218, mouse 1220, and/or other interface devices 1222, which can be any user interface device, such as a touch sensitive screen, digitized entry pad, etc. The bus 1214 may also connect a display device 1224, such as an LCD screen or monitor, to the microprocessor 1212 via a display adapter 1226. The bus 1214 also connects the microprocessor 1212 to memory 1228 and long-term storage 1230 which can include a hard drive, diskette drive, tape drive, etc.

The workstation 1210 may communicate with other computers or networks of computers (not shown in FIG. 12), for example via a communications channel or modem 1232. Alternatively, the workstation 1210 may communicate using a wireless interface at 1232, such as a cellular digital packet data ("CDPD") card. The workstation 1210 may be associated with such other computers in a local area network ("LAN") or a wide area network ("WAN"), or the workstation 1210 can be a client in a client/server arrangement with another computer, etc. All of these configurations, as well as the appropriate communications hardware and software, are known in the art. Reference to a "workstation" is by way of illustration and not of limitation, as many other types of client devices may also render portal pages, including: laptop, handheld or mobile computers; vehicle-mounted devices; desktop computers; servers; and mainframe computers. These types of client devices are well known to those of skill in the art, and a description of such devices herein is not deemed necessary for a thorough understanding of the inventive concepts of the present invention.

It will be obvious to one of skill in the art that a computing environment capable of carrying out server-side aspects of the present invention may be functionally similar to that illustrated in FIG. 12, or may vary in a manner which is readily understood by one of skill in the art. (For example, a server-side environment may omit user interface devices and hardware.) A detailed description of such variations is not deemed necessary to an understanding of the present invention.

As has been demonstrated, the present invention provides advantageous techniques for enabling network-accessible applications to be integrated into content aggregation frameworks and to become dynamically interactive through proxying components, thereby providing run-time cooperation and data sharing. Embodiments of the present invention may comprise proxies acting as cooperation sources, proxies acting as cooperation targets, or both, and a particular proxy may act in one or both of these capacities.

Preferred embodiments have been described herein with reference to using a web portal/portlet model for content aggregation. It should be noted, however, that references herein to using portals, portlets, and workplaces are by way of illustration and not of limitation. Alternatively, techniques disclosed herein may be adapted for use with other content aggregation and content emitter models. The manner in which such adaptation may be carried out will be obvious to one of skill in the art, given the teachings provided herein. Furthermore, references herein to use of a property broker mechanism are also to be construed as illustrative but not limiting.

The network-accessible applications described herein may be deployed as network-accessible services, without deviating from the scope of the present invention. Accordingly, protocols other than HTTP may be used for interacting with such network-accessible applications, such as the well-known Simple Object Access Protocol ("SOAP"). Once provided with the teachings herein, one of skill in the art will readily understand how such alternatives may be supported by embodiments of the present invention.

As will be appreciated by one of skill in the art, embodiments of the present invention may be provided as methods, systems, or computer program products comprising computer-readable program code. Accordingly, the present invention may take the form of an entirely hardware embodiment, an entirely software embodiment, or an embodiment combining software and hardware aspects. The computer program products maybe embodied on one or more computer-usable storage media (including, but not limited to, disk storage, CD-ROM, optical storage, and so forth) having computer-readable program code embodied therein.

When implemented by computer-readable program code, the instructions contained therein may be provided to a processor of a general purpose computer, special purpose computer, embedded processor, or other programmable data processing apparatus to produce a machine, such that the instructions, which execute via the processor of the computer or other programmable data processing apparatus, create means for implementing embodiments of the present invention.

These computer-readable program code instructions may also be stored in a computer-readable memory that can direct a computer or other programmable data processing apparatus to function in a particular manner, such that the instructions stored in the computer-readable memory produce an article of manufacture including instruction means which implement embodiments of the present invention.

The computer-readable program code instructions may also be loaded onto a computer or other programmable data processing apparatus to cause a series of operational steps to be performed on the computer or other programmable apparatus to produce a computer-implemented method such that the instructions which execute on the computer or other programmable apparatus provide steps for implementing embodiments of the present invention.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention. Furthermore, it should be understood that use of "a" or "an" in the claims is not intended to limit embodiments of the present invention to a singular one of any element thus introduced.

What is claimed is:

1. A computer-implemented method of interactively integrating non-portal applications in a portal environment, comprising:

registering, with a property broker of the portal environment by each of a plurality of portlets executing in the portal environment to provide content for aggregation in a content view renderable in the portal environment, at least one property that corresponds to an action that can be triggered on the registering portlet, wherein:

at least one of the registering portlets is a proxy portlet that provides access from the portal environment to a non-portal application where the corresponding action is executable: and the non-portal application lacks an application programming interface used for portlet deployment in the portal environment;

responsive to publishing, in the portal environment at run-time, of one of the at least one property registered by a particular proxy portlet, triggering the corresponding action on the particular proxy portlet;

consulting a mapping, by the particular proxy portlet responsive to the triggered corresponding action on the particular proxy portlet, to determine an invocation target to which the triggered corresponding action corresponds and which is configured to invoke the non-portal application; and automatically invoking the invocation target, by the particular proxy portlet, thereby causing the non-portal application to execute the corresponding action responsive to the run-time publishing.

2. The computer-implemented method according to claim 1, wherein:

the automatically invoking passes a value of the published property as a parameter to the invoked invocation target; and the non-portal application uses the passed value when executing.

3. The computer-implemented method according to claim 1, wherein a first of the proxy portlets provides access to a first non-portal application, at least a second of the proxy portlets provides access to a different non-portal application, and remaining ones of the portlets are content-creating portlets.

4. The computer-implemented method according to claim 1, wherein the mapping comprises, for each of the at least one proxy portlet, configuration data associated therewith, the configuration data comprising: each property to be registered by the proxy portlet; the action to which the property to be registered corresponds; and the invocation target to which the action corresponds.

5. The computer-implemented method according to claim 1, wherein the invocation target comprises a Uniform Resource Locator configured to invoke the non-portal application.

6. The computer-implemented method according to claim 1, further comprising:

configuring the proxy portlet with metadata specifying each property for which the non-portal application executes the corresponding action; and wherein the registering registers each property specified in the configured metadata.

7. The computer-implemented method according to claim 1, wherein the publishing is performed by one of the plurality of portlets which is distinct from the particular proxy portlet, thereby providing interaction between the publishing one of the plurality of portlets and the non-portal application for which the particular proxy portlet provides access.

8. A computer-implemented method for interactively integrating a non-portal application in a portal environment, comprising:

registering, with a property broker by each of a plurality of portlets which provide content for aggregation in a content view renderable in the portal environment, at least one property that corresponds to an action invocable on the registering portlet in response to run-time publishing of the registered property, wherein:

at least one of the portlets is a proxy portlet that provides access from the portal environment to the non-portal application where the corresponding action is executable; and the non-portal application lacks an application programming interface used for portlet deployment in the portal environment;

maintaining a mapping, for each of the at least one proxy portlet, between each action invocable on the proxy portlet and an invocation target that corresponds to the action and that is configured to invoke the non-portal application for which the proxy portlet provides access; and responsive to invocation, on a particular proxy portlet in response to a run-time publishing of any selected one of the at least one property registered by the particular proxy portlet, of the action to which the any selected one corresponds, consulting the mapping to determine the corresponding invocation target for the invoked action and automatically invoking the determined corresponding invocation target, thereby causing the non-portal application to execute the corresponding action responsive to the run-time publishing.

9. The computer-implemented method according to claim 8, wherein the registering is performed during initialization of the portlets.

10. A computer program product for interactively integrating non-portal applications in a portal environment, the computer program product embodied on one or more computer-readable storage media and comprising computer-readable program code instructions for:

registering, with a property broker of the portal environment by each of a plurality of portlets executing in the portal environment to provide content for aggregation in a content view renderable in the portal environment, at least one property that corresponds to an action that can be triggered on the registering portlet, wherein:

at least one of the registering portlets is a proxy portlet that provides access from the portal environment to a non-portal application where the corresponding action is executable; and the non-portal application lacks an application programming interface used for portlet deployment in the portal environment;

responsive to publishing, in the portal environment at run-time, of one of the at least one property registered by a particular proxy portlet, triggering the corresponding action on the particular proxy portlet;

consulting a mapping, by the particular proxy portlet responsive to the triggered corresponding action on the particular proxy portlet, to determine an invocation target to which the triggered corresponding action corresponds and which is configured to invoke the non-portal application; and automatically invoking the invocation target, by the particular proxy portlet, thereby causing the non-portal application to execute the corresponding action responsive to the run-time publishing.

11. The computer program product according to claim 10, wherein:

the automatically invoking passes a value of the published property as a parameter to the invoked invocation target; and the non-portal application uses the passed value when executing.

12. The computer program product according to claim 10, wherein a first of the proxy portlets provides access to a first non-portal application, at least a second of the proxy portlets provides access to a different non-portal application, and remaining ones of the portlets are content-creating portlets.

13. A computer program product for interactively integrating a non-portal application in a portal environment, the computer program product embodied on one or more computer-readable storage media and comprising computer-readable program code instructions for:

registering, with a property broker by each of a plurality of portlets which provide content for aggregation in a content view renderable in the portal environment, at least one property, that corresponds to an action invocable on the registering portlet in response to run-time publishing of the registered property, wherein:

at least one of the portlets is a proxy portlet that provides access from the portal environment to the non-portal application where the corresponding action is executable; and the non-portal application lacks an application programming interface used for portlet deployment in the portal environment;

maintaining a mapping, for each of the at least one proxy portlet, between each action invocable on the proxy portlet and an invocation target that corresponds to the action and that is configured to invoke the non-portal application for which the proxy portlet provides access; and responsive to invocation, on a particular proxy portlet in response to a run-time publishing of any selected one of the at least one property registered by the particular proxy portlet, of the action to which the any selected one corresponds, consulting the mapping to determine the corresponding invocation target for the invoked action and automatically invoking the determined corresponding invocation target, thereby causing the non-portal application to execute the corresponding action responsive to the run-time publishing.

14. The computer program product according to claim 13, wherein the registering is performed during initialization of the portlets.

15. A system for interactively integrating non-portal applications in a portal environment, the system comprising a computer comprising a processor and instructions executable using the processor to perform:

registering, with a property broker of the portal environment by each of a plurality of portlets executing in the portal environment to provide content for aggregation in a content view renderable in the portal environment, at least one property that corresponds to an action that can be triggered on the registering portlet, wherein:

at least one of the registering portlets is a proxy portlet that provides access from the portal environment to a non-portal application where the corresponding action is executable; and the non-portal application lacks an application programming interface used for portlet deployment in the portal environment;

responsive to publishing, in the portal environment at run-time, of one of the at least one property registered by a particular proxy portlet, triggering the corresponding action on the particular proxy portlet;

consulting a mapping, by the particular proxy portlet responsive to the triggered corresponding action on the particular proxy portlet, to determine an invocation target to which the triggered corresponding action corresponds and which is configured to invoke the non-portal application; and automatically invoking the invocation target, by the particular proxy portlet, thereby causing the non-portal application to execute the corresponding action responsive to the run-time publishing.

16. The system according to claim 15, wherein:

the automatically invoking passes a value of the published property as a parameter to the invoked invocation target; and the non-portal application uses the passed value when executing.

17. The system according to claim 15, wherein a first of the proxy portlets provides access to a first non-portal application, at least a second of the proxy portlets provides access to a different non-portal application, and remaining ones of the portlets are content-creating portlets.

* * * * *